US007230644B2

(12) United States Patent
Nakamura et al.

(10) Patent No.: US 7,230,644 B2
(45) Date of Patent: Jun. 12, 2007

(54) IMAGE-SENSING APPARATUS WITH BRIGHTNESS RANGE ADAPTATION FUNCTIONALITY

(75) Inventors: Satoshi Nakamura, Ikeda (JP); So Yano, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 11/028,975

(22) Filed: Jan. 4, 2005

(65) Prior Publication Data
US 2005/0218295 A1    Oct. 6, 2005

Related U.S. Application Data

(63) Continuation of application No. 09/567,804, filed on May 9, 2000, now abandoned.

(30) Foreign Application Priority Data

May 10, 1999 (JP) .................................. 11-128384
Mar. 27, 2000 (JP) ............................. 2000-090683

(51) Int. Cl.
 *H04N 5/202*   (2006.01)
 *H01L 27/00*   (2006.01)
 *G09G 5/00*    (2006.01)
(52) U.S. Cl. ...................... 348/254; 348/255; 345/617; 250/208.1
(58) Field of Classification Search ............. 348/216.1, 348/222.1, 254, 255, 557; 345/617; 250/208.1
See application file for complete search history.

(56) References Cited

U.S. PATENT DOCUMENTS

| 4,182,573 | A | * | 1/1980 | Yamada et al. ............. 356/218 |
| 4,811,090 | A | | 3/1989 | Khurana |
| 4,926,247 | A | | 5/1990 | Nagasaki et al. |
| 5,008,698 | A | | 4/1991 | Muramatsu et al. |
| 5,138,458 | A | | 8/1992 | Nagasaki et al. |
| 5,182,658 | A | | 1/1993 | Ishizaki et al. |
| 5,241,575 | A | | 8/1993 | Miyatake et al. |
| 5,327,246 | A | | 7/1994 | Suzuki |
| 5,497,215 | A | | 3/1996 | Iwasaki |
| 5,526,092 | A | | 6/1996 | Iwasaki |
| 5,617,484 | A | | 4/1997 | Wada et al. |
| 5,701,526 | A | | 12/1997 | Iwasaki |
| 6,002,445 | A | * | 12/1999 | Urayama .................... 348/572 |
| 6,101,273 | A | * | 8/2000 | Matama ...................... 382/169 |
| 6,101,294 | A | | 8/2000 | McCaffrey et al. |
| 6,181,321 | B1 | * | 1/2001 | Zhao et al. ................. 345/617 |
| 6,204,881 | B1 | * | 3/2001 | Ikeda et al. ................. 348/362 |
| 6,515,702 | B1 | | 2/2003 | Yadid-Pecht et al. |

FOREIGN PATENT DOCUMENTS

DE    19 619 734 A    11/1996

\* cited by examiner

*Primary Examiner*—Lin Ye
(74) *Attorney, Agent, or Firm*—Sidley Austin LLP

(57) ABSTRACT

An image-sensing apparatus has an area sensor 1 that outputs image data by logarithmically converting the brightness of light incident thereon, a black-level detector 2 for detecting the black level BL of the image data at which the image data has the lowest signal level, a white-level detector 3 for detecting the white level WL of the image data at which the image data has the highest signal level, a calculation formula determiner 4 for determining, in accordance with the detected black and white levels BL and WL, the formula to be used to convert the signal level of the image data, and a dynamic range converter 5 for converting the signal level of the image data using the calculation formula determined by the calculation formula determiner 4.

27 Claims, 12 Drawing Sheets

IMAGE-SENSING APPARATUS WITH BRIGHTNESS RANGE ADAPTATION FUNCTIONALITY

This application is a continuation application of application Ser. No. 09/567,804, filed May 9, 2000 now abandoned, which is based on applications Nos. H11-128384 and 2000-090683 filed in Japan on May 10, 1999 and Mar. 27, 2000, respectively, the entire contents of which is hereby incorporated by reference.

BACKGROUND OF THE INVENTION

1. Field of the Invention

The present invention relates to an image-sensing apparatus having a photoelectric conversion device that outputs a signal that is logarithmically proportional to the amount of incident light.

2. Description of the Prior Art

A conventional area sensor having photosensitive devices such as photodiodes outputs a signal that is linearly proportional to the brightness of the light incident on the photosensitive devices as shown at (a) in FIG. 15. When a subject having brightness distribution as shown at (b) in FIG. 15 is shot with such a linear-conversion-based area sensor (hereafter referred to as a "linear sensor"), no brightness data is obtained outside the roughly two-digit brightness range (dynamic range) within which the linear sensor can effectively perform image sensing (this brightness range will hereinafter be referred to as the "shootable brightness range").

Accordingly, when the signal from this linear sensor is reproduced as an image on a display or the like, the displayed image suffers from flat blackness in low-brightness portions thereof and saturation in high-brightness portions thereof outside the shootable brightness range. It is possible to avoid flat blackness by shifting the shootable brightness range leftward or avoid saturation by shifting it rightward. However, this requires varying the aperture value or shutter speed of a camera, or the integral time for which to allow light in, and thus spoils ease of use.

On the other hand, in U.S. Pat. No. 5,241,575, the applicant of the present invention once proposed an area sensor (hereinafter referred to as a "LOG sensor") provided with a light-sensing means that outputs a photocurrent in proportion to the amount of incident light, a MOS transistor to which the photocurrent is fed, and a bias means for biasing the MOS transistor in such a way that a subthreshold current flows therethrough, so that the photocurrent is converted logarithmically. This LOG sensor outputs a signal whose level is natural-logarithmically proportional to the amount of incident light as shown at (a) in FIG. 16, and thus offers a wide, specifically five- to six-digit, dynamic range. This permits, even in cases in which the brightness distribution tends to shift, the brightness distribution of a given subject to lie most probably within the shootable brightness range as shown at (b) in FIG. 16.

However, a typical subject has a two- to three-digit brightness range, and therefore, if it is shot with a LOG sensor that offers a five- to six-digit dynamic range, the shootable brightness range is too wide relative to the actual brightness distribution of the subject, and thus a region where no brightness data is available is left in a low-brightness or high-brightness portion of the shootable brightness range. Specifically, as shown at (a) in FIG. 16, with respect to the dynamic range DRa of the LOG sensor, the range DRb of the output that corresponds to the brightness distribution of the subject is considerably narrow. Thus, when the output signal of this LOG sensor is subjected to level conversion so as to be converted, for example, into an eight-bit digital signal as shown in FIG. 17 in order to display an image on an output device such as a display, if conversion is so performed that the dynamic range DRc of the output device is adapted to the dynamic range DRa of the LOG sensor and that the maximum and minimum output values of the LOG sensor correspond to the maximum and minimum output levels (255 and 0), respectively, of the output device, the output device receives a signal whose level varies only within a range DRd which is merely a portion of the range covered by the eight-bit digital signal. Thus, when the image of a subject having brightness distribution as described above is reproduced using such a signal, the black portions of the image, where the brightness is lowest, are reproduced as dark gray, and the white portions thereof, where the brightness is highest, are reproduced as light gray, making the entire image low-contrast.

SUMMARY OF THE INVENTION

An object of the present invention is to provide an image-sensing apparatus that performs signal processing in such a way as to adapt the dynamic range of an image shot with a LOG sensor to the dynamic range of an output device.

To achieve the above object, according to the present invention, an image-sensing apparatus is provided with: a photoelectric conversion device, having a plurality of photosensitive devices that produce electric signals in accordance with the brightness of light incident thereon, for converting logarithmically the electric signals produced by the individual photosensitive devices; a determiner for determining the brightness range of a subject; and a converter for performing level conversion on the electric signals output from the photoelectric conversion device in such a way that the brightness range of the subject as determined by the determiner is adapted to the dynamic range of an output device used to reproduce an image.

With this image-sensing apparatus, even if the subject shot has a brightness range narrower than the dynamic range of an area sensor used as the photoelectric conversion device, the output level of the sensor is converted in such a way that the brightness range of the subject is adapted to the dynamic range of the output device, and thus it is possible to feed the output device with a signal that conforms to the dynamic range of the output device.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

Figure 1:
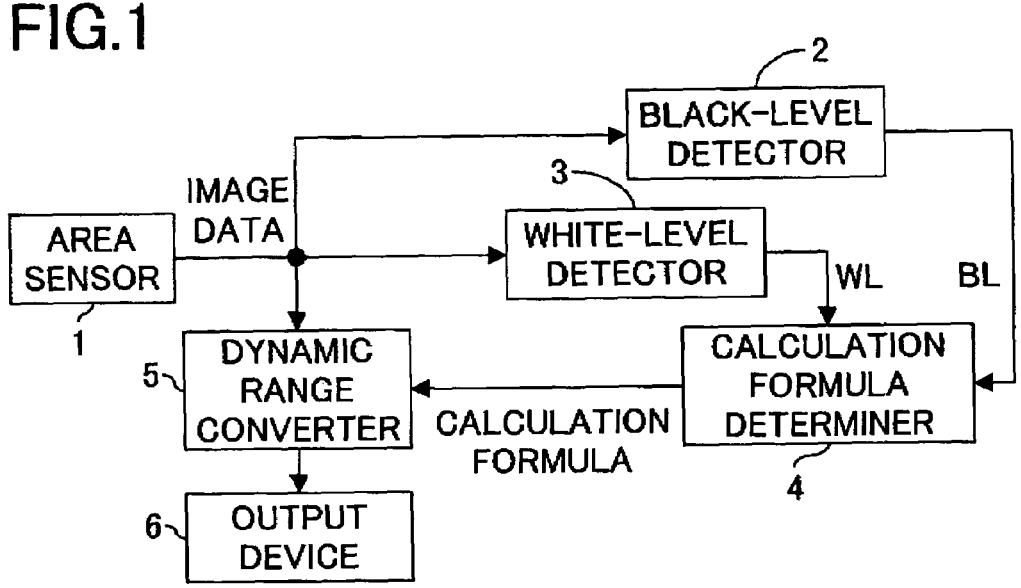
FIG. 1 is a block diagram showing the internal configuration of the image-sensing apparatus of a first embodiment of the invention.

A first embodiment of the present invention will be described below with reference to the relevant drawings. FIG. 1 is a block diagram showing the configuration of the image-sensing apparatus of this embodiment. This image-sensing apparatus is of a type that employs a logarithm-conversion-based area sensor (LOG sensor) and that permits shooting of a subject in motion.

The image-sensing apparatus shown in FIG. 1 has an area sensor 1 that has pixels, realized with photosensitive devices, arranged in a matrix and that produces an electric signal (hereafter referred to as the "image data") by logarithmically converting the brightness of light incident thereon, a black-level detector 2 that detects, among a plurality of pixels constituting the image data, the signal level of that pixel which shows the lowest signal level (hereafter referred to as the "black level"), a white-level detector 3 that detects, among the plurality of pixels constituting the image data, the signal level of that pixel which shows the highest signal level (hereafter referred to as the "white level"), a calculation formula determiner 4 that determines, using the black and white levels detected by the black-level and white-level detectors 2 and 3, the calculation formula to be used by a dynamic range converter 5, a dynamic range converter 5 that performs calculation on the image data output from the area sensor 1 using the calculation formula determined by the calculation formula determiner 4, and an output device 6, such as a display, on which an image is reproduced on the basis of the image data that has gone through the calculation performed by the dynamic range converter 5. The output device 6 may be provided as a separate unit, in which case connection therewith is achieved by way of a connection cable (not shown).

In this image-sensing apparatus configured as described above, when image data corresponding to one frame is fed from the area sensor 1 to each of the black-level and white-level detectors 2 and 3, they detect from this image data corresponding to one frame the black level and the white level, respectively. Here, the shootable brightness range of the area sensor 1 and the brightness distribution of the subject have a relationship as shown at (a) in FIG. 2, where the brightness that corresponds to the black level detected by the black-level detector 2 is marked PA and the brightness that corresponds to the white level detected by the white-level detector 3 is marked PB. These brightness values PA and PB correspond to BL and WL, respectively, at (b) in FIG. 2.

Figure 2:
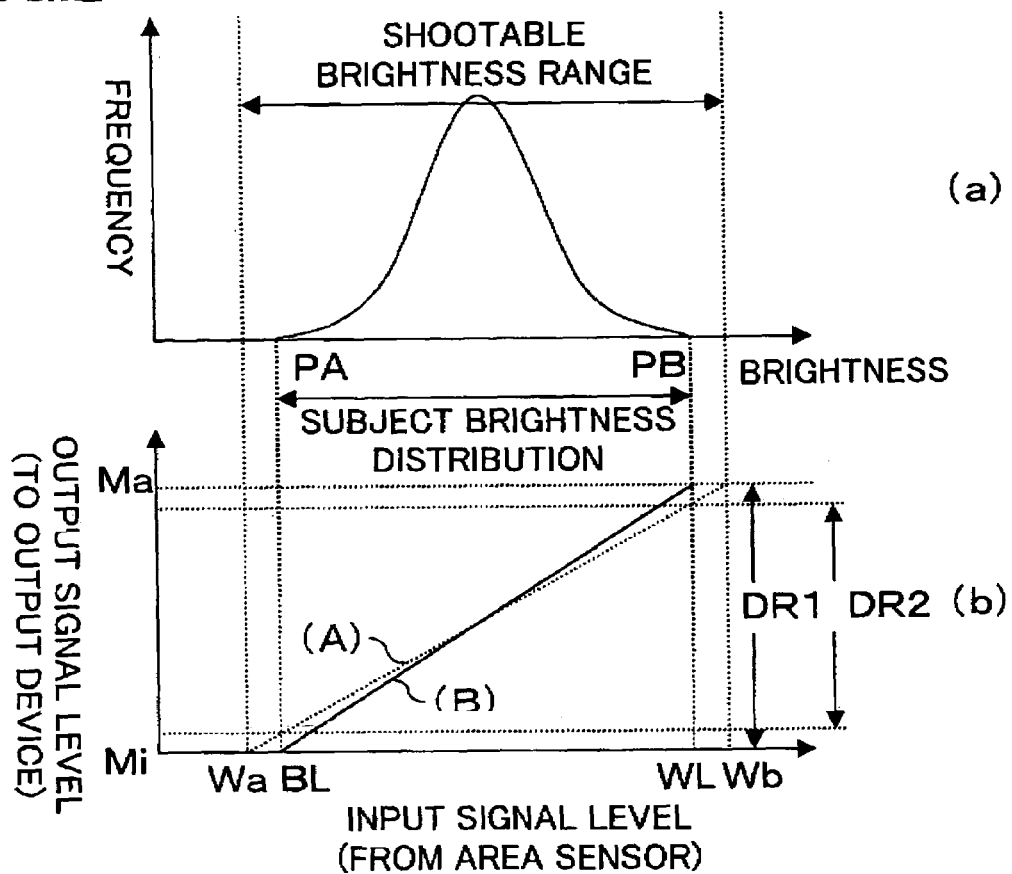
FIG. 2 is a graph showing the relationship among the brightness distribution of a subject, the level of the input signal to the output device, and the level of the output signal from the area sensor.

At (b) in FIG. 2 is shown the relationship between the level of the output signal from the area sensor 1 (taken along the horizontal axis) and the level of the signal fed to the output device 6 (taken along the vertical axis). Here, the characteristic (A) indicated by a dotted line is the characteristic of the output device obtained when the output signal from the area sensor 1 is used intact. In this case, a dynamic range DR1 is obtained, with the maximum and minimum values at Ma and Mi. This dynamic range DR1 covers input levels ranging from Wa to Wb, which corresponds to the entire shootable brightness range of the area sensor 1. Thus, if image data having brightness distribution as shown at (a) in FIG. 2 is used intact, the output signal from the area sensor 1 lies within the range BL-WL, which lies inside the entire range covered by the characteristic (A). This makes the range DR2 of the signal fed to the output device 6 unnecessarily narrow, and makes the output image low-contrast as described earlier. To avoid this, in this embodiment, the output signal from the area sensor 1 is subjected to calculation that corrects the characteristic (A) to the characteristic (B) indicated by a solid line. This calculation is performed using a calculation formula like $$y = \frac{Ma - Mi}{WL - BL}(x - BL) \qquad (1)$$

where x and y are variables that represent the levels taken along the horizontal and vertical axes, respectively, at (b) in FIG. 2.

Figure 3:
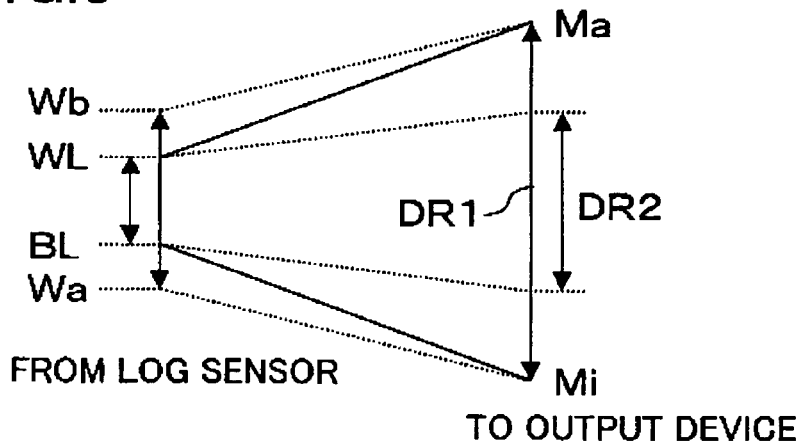
FIG. 3 is a diagram showing the relationship between the dynamic range of the area sensor and the level of the signal fed to the output device.

This calculation formula (1), or a similar formula, is given from the calculation formula determiner 4 to the dynamic range converter 5, so that the dynamic range converter 5 substitutes the signal level of the image data fed from the area sensor 1 as x in the calculation formula (1) and thereby converts the signal level into y. This conversion permits the image data, having a range BL-WL, output from the area sensor 1 to be converted into image data having signal levels adapted to the dynamic range DR1 of the output device 6 as shown in FIG. 3. That is, whereas the signal fed to the output device 6 has a range DR2 when the output signal from the area sensor 1 is used intact as described previously, in this embodiment, this range is expanded to a range DR1, which conforms to the dynamic range of the output device 6. This helps prevent a region from being left within the shootable brightness range where no part of the brightness range of the subject lies, and thereby permits the output device 6 to output a satisfactory high-contrast image.

Here, the dynamic range converter 5 may be provided with a delay circuit so that, when it is given a calculation formula like the calculation formula (1) from the calculation formula determiner 4, it can perform calculation on the image data of the same frame that was used to determine the calculation formula. Alternatively, the dynamic range converter 5 may perform calculation on image data using the calculation formula determined on the basis of the image data of the previous frame. In cases where quick response is not required in reflecting the result of calculation, the calculation formula may be determined every predetermined number of frames so that the dynamic range converter 5 continues performing calculation on image data using the calculation formula determined previously until a new one is determined next time.

Second Embodiment

Figure 4:
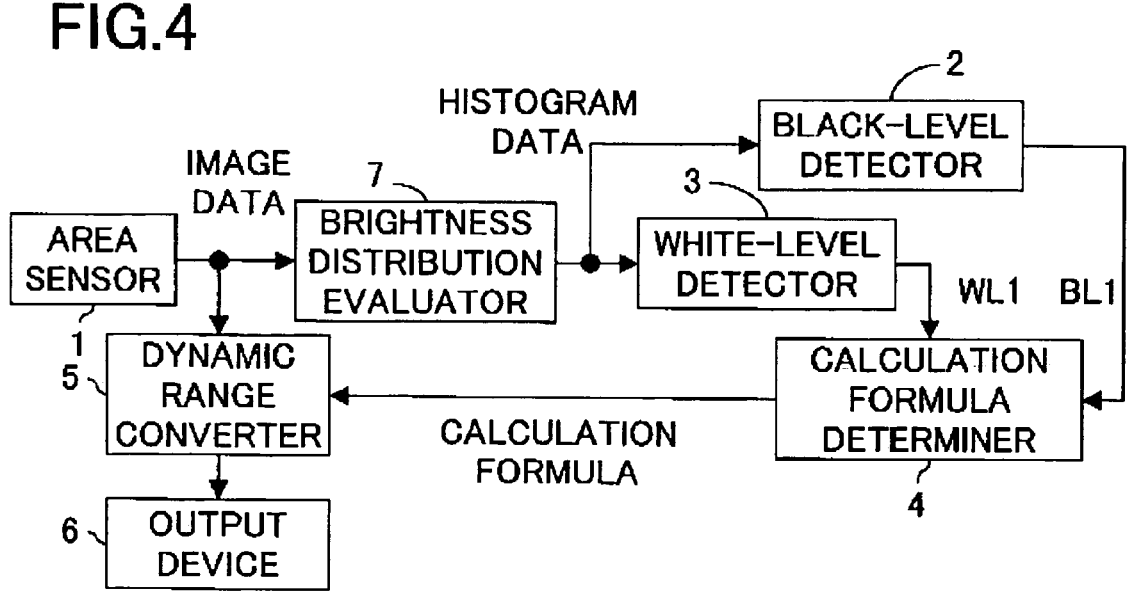
FIG. 4 is a block diagram showing the internal configuration of the image-sensing apparatus of a second embodiment of the invention.

A second embodiment of the present invention will be described below with reference to the relevant drawings. FIG. 4 is a block diagram showing the configuration of the image-sensing apparatus of this embodiment. It is to be noted that, in the following descriptions of this embodiment, such blocks as serve the same purposes as in FIG. 2 are identified with the same reference numerals, and their detailed descriptions will be omitted.

The image-sensing apparatus shown in FIG. 4 has an area sensor 1, a black-level detector 2, a white-level detector 3, a calculation formula determiner 4, a dynamic range converter 5, an output device 6, and a brightness distribution evaluator 7 for evaluating the brightness distribution (histogram) of the image data output from the area sensor 1.

In this image-sensing apparatus configured as described above, when image data corresponding to one frame is fed from the area sensor 1 to the brightness distribution evaluator 7, the signal levels of the individual pixels constituting this image data corresponding to one frame are measured so that the frequencies of different signal levels within the image data are counted. That is, how many of the pixels of the area sensor 1 are illuminated with light of a particular brightness value is counted for each of possible brightness values. In this way, by counting the frequencies of different brightness values in the image data of a subject, the brightness distribution evaluator 7 evaluates the brightness distribution of the subject.

Figure 5:
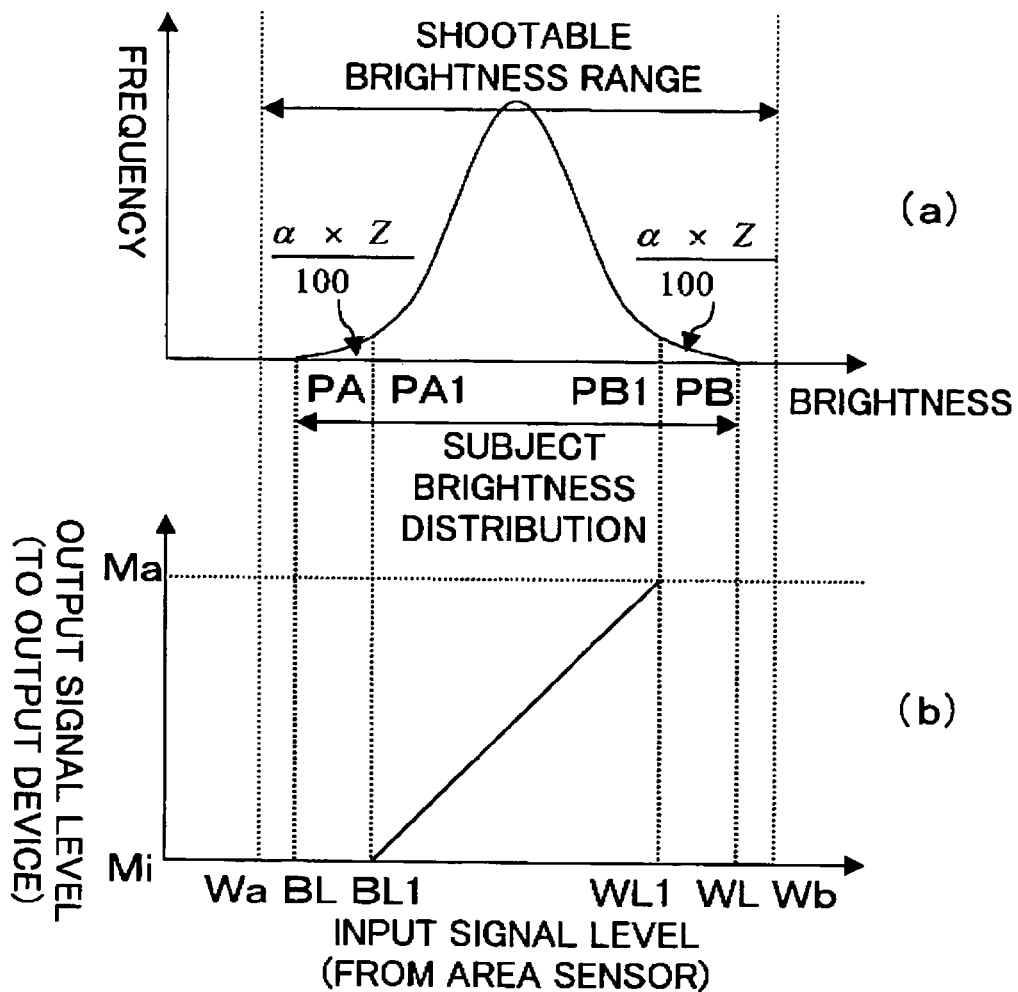
FIG. 5 is a graph showing the relationship among the brightness distribution of a subject, the level of the input signal to the output device, and the level of the output signal from the area sensor.

Moreover, the brightness distribution evaluator 7 calculates the summation of the signal levels of all of the pixels constituting the image data corresponding to one frame in order to calculate the integral of the brightness distribution in the interval between brightness PA and brightness PB shown at (a) in FIG. 5 (this value will hereafter be referred to as "the value of the area of the entire brightness distribution"). Here, assume that this value is equal to Z, and that, to simplify the explanation, the brightness values PA and PB are defined in the same manner as in the first embodiment. At the brightness PA and PB, the image data has levels BL and WL, respectively, as shown at (b) in FIG. 5.

When this value Z representing the value of the area of the entire brightness distribution is calculated, it is fed to the black-level and white-level detectors 2 and 3. Moreover, at this time, the brightness distribution evaluator 7 feeds the image data of the sensed frame, on the one hand starting with that of the pixels showing the lowest signal level upward, to the black-level detector 2 and, on the other hand starting with that of the pixels showing the highest signal level downward, to the white-level detector 3.

On receiving the image data from the brightness distribution evaluator 7, the black-level and white-level detectors 2 and 3 each add together the signal levels of the image data one after another in the order in which they receive them. When the value of the added-up signal levels reach α percent of the value Z, i.e. α×Z/100, the black-level and white-level detectors 2 and 3 detect the signal level of the image data at that moment. This value α may be specified from the outside, or may be stored beforehand in memory (not shown) or the like. It is also possible to specify different values of α for the black-level and white-level detectors 2 and 3.

The levels of the image data thus detected in the black-level and white-level detectors 2 and 3 are used as the black level and the white level, respectively. The black and white levels detected here are marked BL1 and WL1 at (b) in FIG. 5. Thus, at (a) in FIG. 5, these black and white levels BL1 and WL1 correspond to the brightness marked PA1 and PB1, respectively. Accordingly, in the brightness distribution shown at (a) in FIG. 5, the value α×Z/100 corresponds to one of the portions thereof covering brightness from PA to PA1 and from PB to PB1, of which each has an area that is equal to α percent of the value of the area of the entire brightness distribution.

Then, as in the first embodiment, the calculation formula determiner 4 determines a calculation formula that is the same as the calculation formula (1) used in the first embodiment except that the black and white levels BL1 and WL1 are used instead of the black and white levels BL and WL. Subsequently, as in the first embodiment, using the thus determined calculation formula, the dynamic range converter 5 performs calculation on the image data output from the area sensor 1.

With this image-sensing apparatus operating as described above, even if the subject has brightness distribution with gentle slopes (indicating small variation in the frequencies of different brightness values) in hem portions of the distribution curve (i.e. in high-brightness and low-brightness end portions thereof), it is possible to cut such hem portions so that conversion is performed in such a way that the image data is output with more stable contrast. Of course, even with a subject having brightness distribution that corresponds to a three-digit or wider dynamic range, it is possible to cut hem portions so that conversion is performed in such a way that the image data is output with more stable contrast, and thus it is possible to shoot the subject properly without fear of flat blackness or saturation. Moreover, since image data is obtained as an output signal from a LOG sensor, it is possible to cope with a subject having a dynamic range too wide to be shot with a conventional linear sensor.

Third Embodiment

Figure 6:
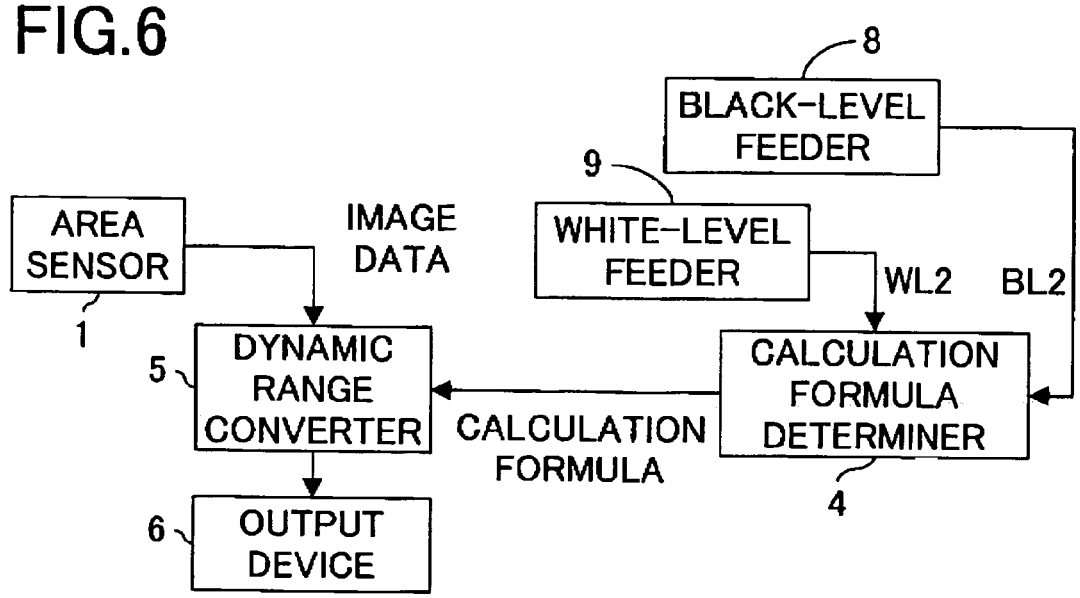
FIG. 6 is a block diagram showing the internal configuration of the image-sensing apparatus of a third embodiment of the invention.

A third embodiment of the present invention will be described below with reference to the relevant drawings. FIG. 6 is a block diagram showing the configuration of the image-sensing apparatus of this embodiment. It is to be noted that, in the following descriptions of this embodiment, such blocks as serve the same purposes as in FIG. 1 are identified with the same reference numerals, and their detailed descriptions will be omitted.

The image-sensing apparatus shown in FIG. 6 has an area sensor 1, a calculation formula determiner 4, a dynamic range converter 5, an output device 6, a black-level feeder 8 for allowing entry of a black-level value from the outside, and a white-level feeder 9 for allowing entry of a white-level value from the outside.

In this image-sensing apparatus, a black level BL2 and a white level WL2 are entered into the black-level and white-level feeders 8 and 9 from the outside by the user in accordance with the brightness range that the user desires. The black and white levels BL2 and WL2 entered into the black-level and white-level feeders 8 and 9 are then fed to the calculation formula determiner 4. Thus, the calculation formula determiner 4 determines a calculation formula that is the same as the calculation formula (1) used in the first embodiment except that the black and white levels BL2 and WL2 are used instead of the black and white levels BL and WL. Subsequently, as in the first embodiment, using the thus determined calculation formula, the dynamic range converter 5 performs calculation on the image data output from the area sensor 1.

This image-sensing apparatus permits the user to enter a black level and a white level. Thus, the user can set the brightness range as desired while observing an image displayed on the output device 6 such as a display, and can thus obtain an image to his or her liking.

Fourth Embodiment

Figure 7:
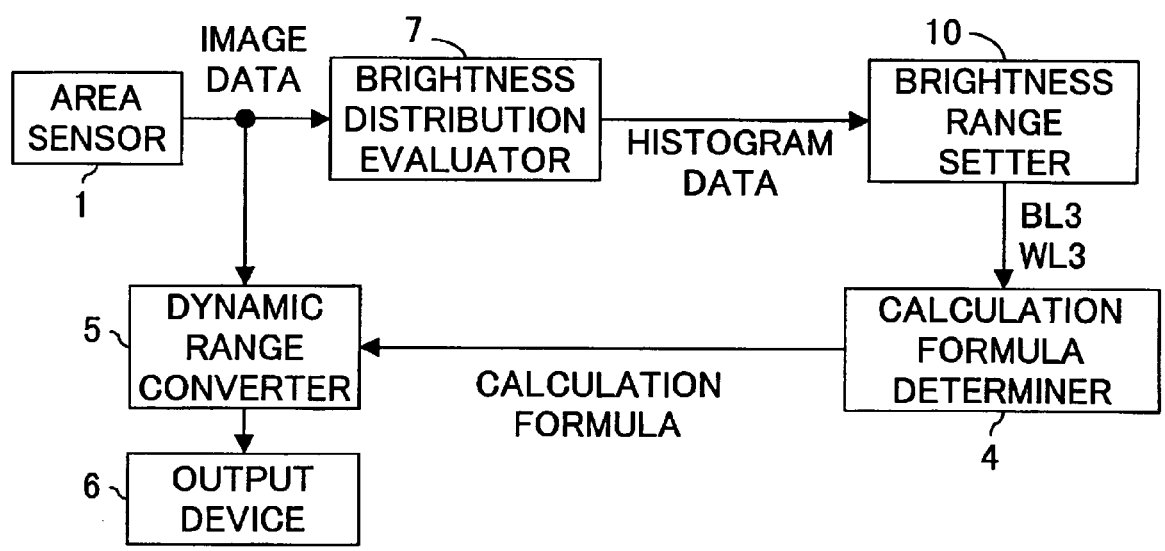
FIG. 7 is a block diagram showing the internal configuration of the image-sensing apparatus of a fourth embodiment of the invention.

A fourth embodiment of the present invention will be described below with reference to the relevant drawings. FIG. 7 is a block diagram showing the configuration of the image-sensing apparatus of this embodiment. It is to be noted that, in the following descriptions of this embodiment, such blocks as serve the same purposes as in FIG. 4 are identified with the same reference numerals, and their detailed descriptions will be omitted.

The image-sensing apparatus shown in FIG. 7 has an area sensor 1, a calculation formula determiner 4, a dynamic range converter 5, an output device 6, a brightness distribution evaluator 7, and a brightness range setter 10 that determines the brightness range of a subject in accordance with the shape of the brightness distribution evaluated by the brightness distribution evaluator 7. In this embodiment, the brightness range that is fed to the output device is determined not solely on the basis of the maximum and minimum values of the brightness distribution of the subject, but also in consideration of the shape of the brightness distribution.

Figure 8:
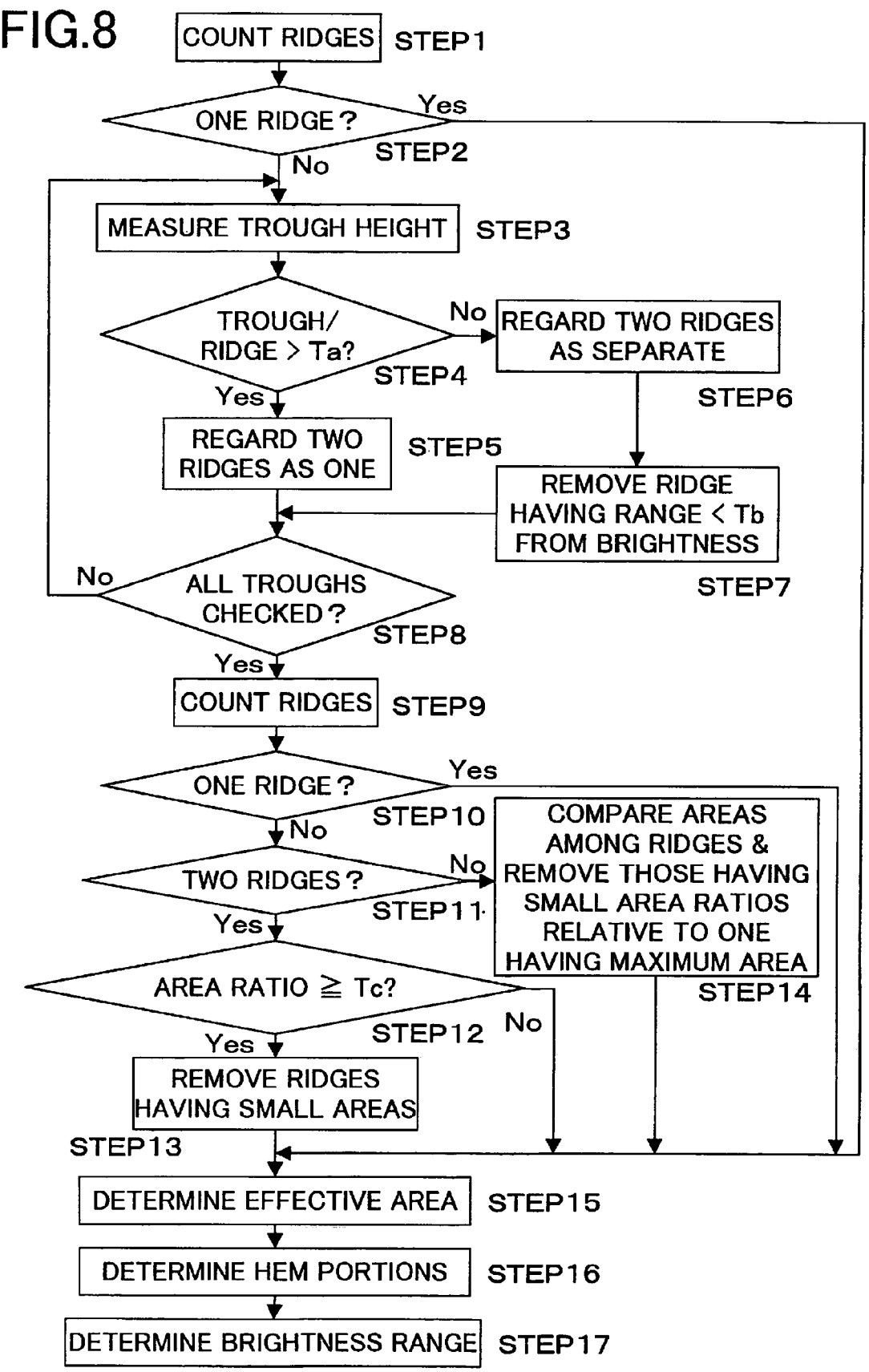
FIG. 8 is a flow chart showing the operation of the brightness range setter.
Figure 9:
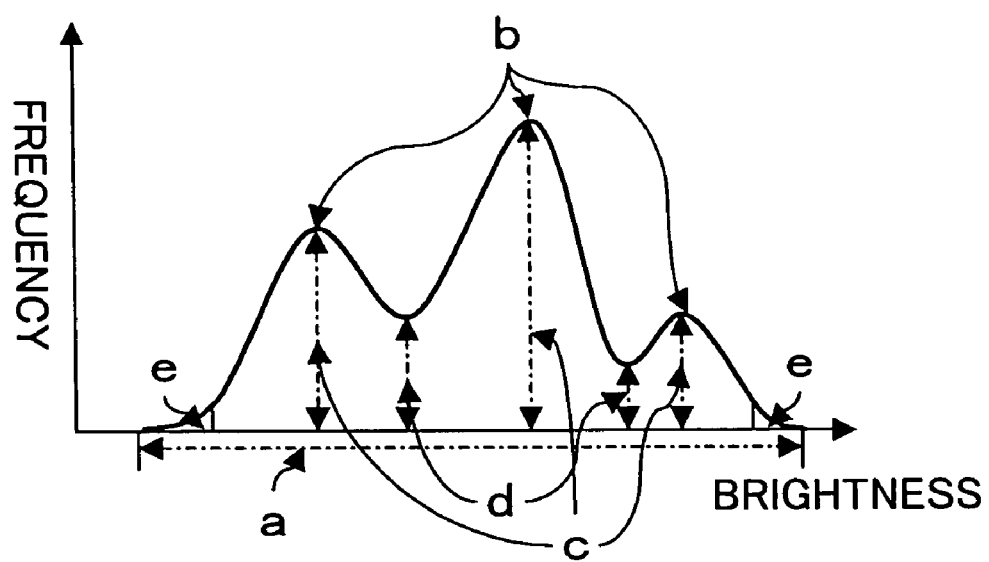
FIG. 9 is a diagram showing an example of brightness distribution.

FIG. 8 is a flow chart showing the flow of operations performed by the brightness range setter 10 to determine a brightness range. FIG. 9 shows an example of brightness distribution, with brightness taken along the horizontal axis and the frequencies of different brightness values taken along the vertical axis. In the following descriptions, on a curve defining a particular brightness distribution, a point that corresponds to a maximum value is referred to as a "ridge" and a point that corresponds to a minimum value is referred to as a "trough"; the frequency observed at a ridge is referred to as "the height of the ridge" and the frequency observed at a trough is referred to as "the height of the trough"; the portions of the brightness distribution near both ends thereof, where the frequencies observed are largely low, are called "hem portions". Thus, in FIG. 9, a indicates the width of a brightness range, b indicates the number of ridges, c indicates the height of ridges, d indicates the height of troughs, and e indicates the hem portions of the distribution curve.

Figure 10A:
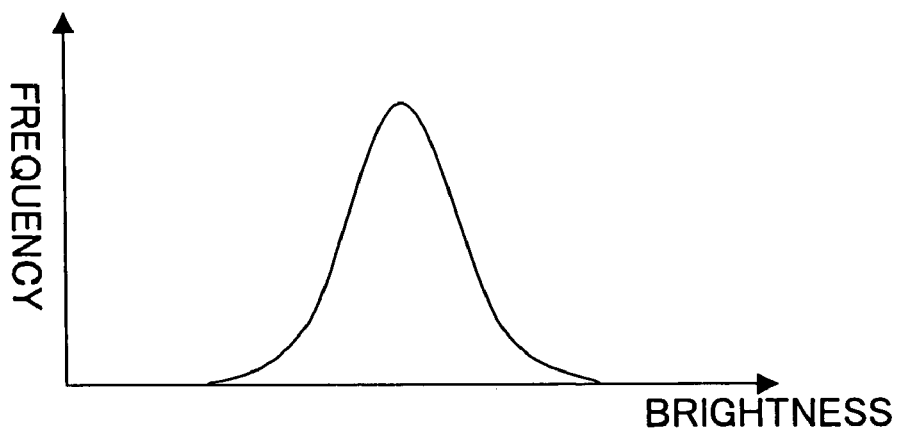
FIGS. 10A to 10C are diagrams showing examples of brightness distribution.
Figure 10B:
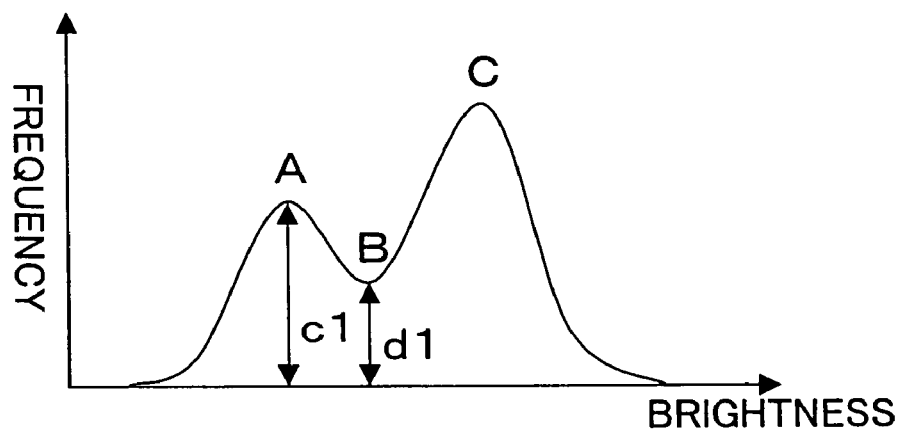

As in the second embodiment, when image data corresponding to one frame is fed from the area sensor 1 to the brightness distribution evaluator 7, the brightness distribution evaluator 7 evaluates the brightness distribution of the subject. Subsequently, when the brightness distribution evaluated by the brightness distribution evaluator 7 is fed to the brightness range setter 10, first, the number of ridges is counted (STEP 1). If the number of ridges thus counted is one as shown in FIG. 10A (Yes), the operation flow proceeds to STEP 15; if the number of ridges is more than one as shown in FIG. 10B (No), the operation flow proceeds to STEP 3 (STEP 2). When the operation flow proceeds from STEP 2 to STEP 3, the height of the trough is measured. If the ratio of the height of the trough measured here to the height of the lower one of the two ridges adjacent thereto is greater than a threshold value Ta (Yes), the operation flow proceeds to STEP 5; if that ratio is less than the threshold value Ta (No), the operation flow proceeds to STEP 6 (STEP 4). That is, in the case shown in FIG. 10B, in STEP 4, whether the ratio $(d1)/(c1)$ of the height d1 of the trough B to the height of the lower one of the ridges A and C adjacent thereto is greater than Ta or not is checked.

When the operation flow proceeds from STEP 4 to STEP 5, instead of regarding the lower ridge as an independent ridge, the two ridges adjacent to the trough is regarded as a single ridge as a whole. That is, in FIG. 10B, if the trough B is so high that the ratio of its height to the height of the lower ridge A is greater than the threshold value Ta, the lower ridge A is regarded no longer as an independent ridge but as part of the higher ridge C. When the operation flow proceeds from STEP 4 to STEP 6, the two ridges adjacent to the trough are regarded as separate and thus independent ridges. That is, in FIG. 10B, if the trough B is so low that the ratio of its height to the height of the lower ridge A is lower than the threshold value Ta, the ridges A and C are regarded as independent ridges.

Figure 10C:
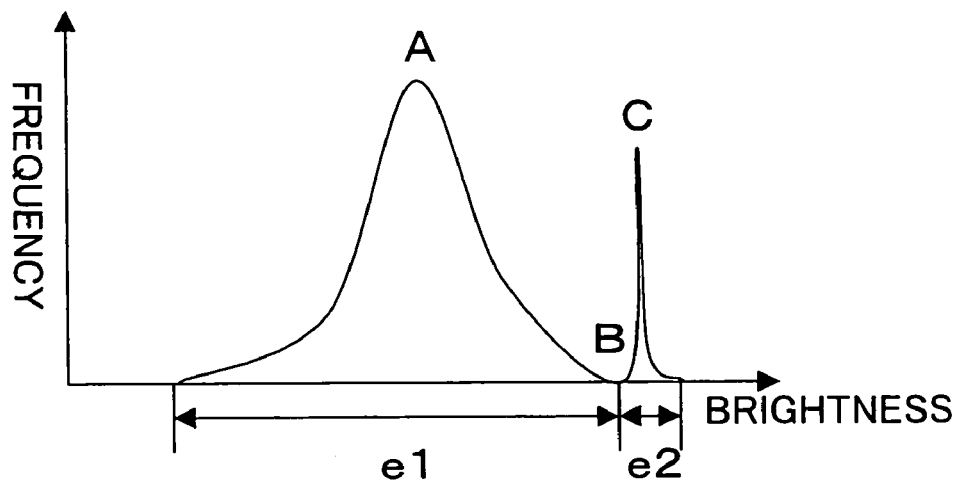

When, in STEP 6, the two ridges adjacent to the trough are found to be separate from each other, then, if any of those two ridges has a brightness range narrower than a threshold value Tb, it is no longer regarded as a ridge and is excluded from the brightness distribution (STEP 7). Here, the brightness range of a ridge is defined as the range between the brightness values at the two troughs adjacent thereto, or alternatively, in the case of a ridge located at one end of the brightness distribution, as the range between that end and the brightness value at the trough adjacent to the ridge on the opposite side thereof. Thus, if, as shown in FIG. 10C, the brightness range e1 of the ridge A is wider than the threshold value Tb, and the brightness range e2 of the ridge C is narrower than the threshold value Tb, the ridge C is no longer regarded as a ridge and is excluded from the brightness distribution.

When the operation flow proceeds from STEP 5 or STEP 7 to STEP 8, whether all the troughs within the evaluated brightness distribution have already been subjected to the operations in STEP 3 to STEP 7 or not is checked. If all the troughs have already been subjected to the operations in STEP 3 to STEP 7 (Yes), the operation flow proceeds to STEP 9; if any of the troughs has not yet been subjected to those operations (No), the operation flow returns to STEP 3 to repeat those operations.

In STEP 9, the number of ridges is counted once again. If the number of ridges counted here is one (Yes), the operation flow proceeds to STEP 15; if the number of ridges is more than one (No), the operation flow proceeds to STEP 11 (STEP 10). In STEP 11, whether the number of ridges is two or not is checked. If the number of ridges is two (Yes), the operation flow proceeds to STEP 12; if the number of ridges is three or more (No), the operation flow proceeds to STEP 14. In STEP 12, whether the area ratio calculated by dividing the area of the ridge having the larger area by that of the ridge having the smaller area is greater than a threshold value Tc or not is checked. If this area ratio is greater than the threshold value Tc (Yes), the operation flow proceeds to STEP 13, where the ridge having the smaller area is excluded from the brightness distribution; if the area ratio is smaller than the threshold value Tc (No), the operation flow proceeds to STEP 15.

Figure 11:
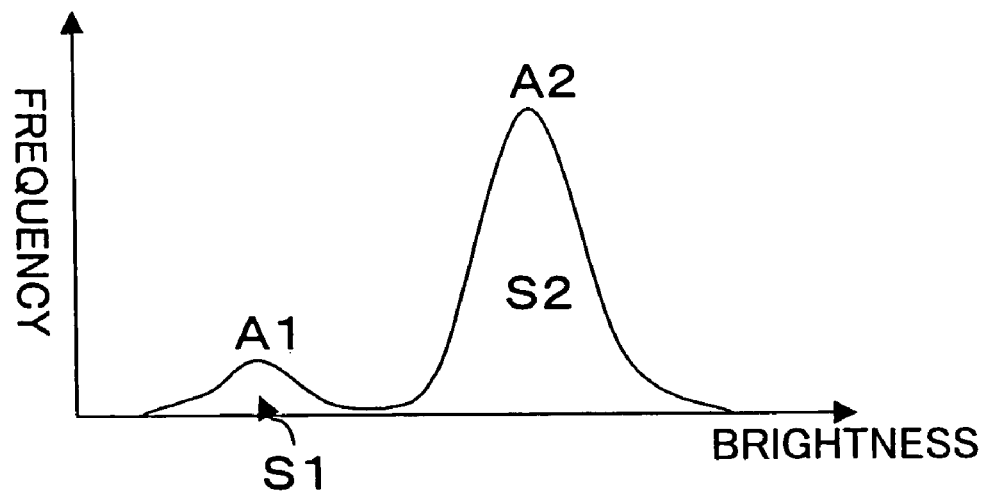
FIG. 11 is a diagram showing an example of brightness distribution.

In STEP 13, the ridge having the smaller area is excluded from the brightness distribution, and the remaining portion is determined as the effective region. That is, as shown in FIG. 11, if, in STEP 9, two ridges A1 and A2 are recognized, their respective areas S1 and S2 are calculated, and then, since S1<S2 here, the area ratio (S2)/(S1) is compared with the threshold value Tc (STEP 12). In this case, if the area ratio (S2)/(S1) is greater than the threshold value Tc, the ridge A1 having the smaller area is excluded from the brightness distribution, and thus the brightness distribution is regarded as being formed by the ridge A2. Here, the area of a ridge is defined as the integral with respect to brightness of the frequencies of different brightness values between the troughs adjacent thereto, or alternatively, in the case of a ridge located at one end of the brightness distribution, as the integral with respect to brightness of the frequencies of different brightness values between that end and the trough adjacent to the ridge on the opposite side thereof.

Figure 12:
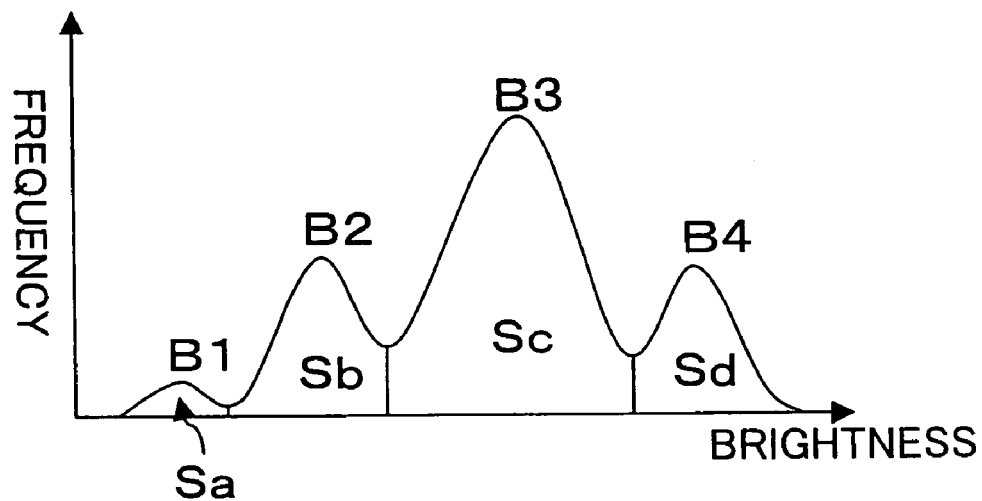
FIG. 12 is a diagram showing an example of brightness distribution.

In STEP 14, out of the ridges still regarded as ridges, the one having the largest area is selected as the reference, and, in order of decreasing distance to this reference ridge, the area ratio calculated by dividing the area of each of the other ridges by the area of the reference ridge having the largest area is compared, one after another, with a threshold value Td. Here, any ridge of which the area ratio is smaller than the threshold value Td is no longer regarded as a ridge, and is excluded from the brightness distribution. When ridges of which the area ratios are larger than the threshold value Td are found on both sides, i.e. lower-brightness and higher-brightness sides, of the reference ridge having the largest area, the portion remaining at that moment is determined as the effective region, and the operation flow is ended. That is, as shown in FIG. 12, if, in STEP 9, four ridges B1 to B4 are recognized, their respective areas Sa to Sd are calculated, and, when the area Sc is the largest of all these areas, the area ratios (Sa)/(Sc)/(Sd)/(Sc), and (Sb)/(Sc) are compared, in this order, with the threshold value Td. Here, relative to the ridge B3, the ridges B1, B4, and B2 are so located that their distances to the ridge B3 increases in the order named.

Here, assume that the area ratio (Sa)/(Sc) is smaller than the threshold value Td, and that the area ratios (Sd)/(Sc) and (Sb)/(Sc) are greater than the threshold value Td. In this case, first, the ridge B1 is checked, and its area ratio is found to be smaller than the threshold value Td. Thus, the ridge B1 is no longer regarded as a ridge and is thus excluded from the brightness distribution. Next, the ridge B4 is checked, and its area ratio is found to be greater than the threshold value Td. Thus, the checking of the ridges that are located on the higher-brightness side of the ridge B3 is ended. Next, the ridge B2 is checked, and its area ratio is found to be greater than the threshold value Td. Thus, the checking of the ridges that are located on the lower-brightness side of the ridge B3 is ended. When the operation in STEP 14 is completed in this way, the operation flow proceeds to STEP 15.

In STEP 15, the area of the ridges excluded from the brightness distribution is subtracted from the area of the entire brightness distribution, and the area that remains thereafter is determined as the effective area. That is, if only one ridge is recognized in STEP 2 or STEP 10, or if the area ratios of two ridges are smaller than the threshold value Tc in STEP 12, then the entire brightness distribution is determined as the effective area; on the other hand, when the operation flow proceeds from STEP 13 or STEP 14 to STEP 15, the area that remains after subtracting the area of the ridges excluded from the brightness distribution in STEP 13 or STEP 14 from the area of the entire brightness distribution is determined as the effective area. Thus, the effective area is the area of the effective region mentioned above.

Figure 13:
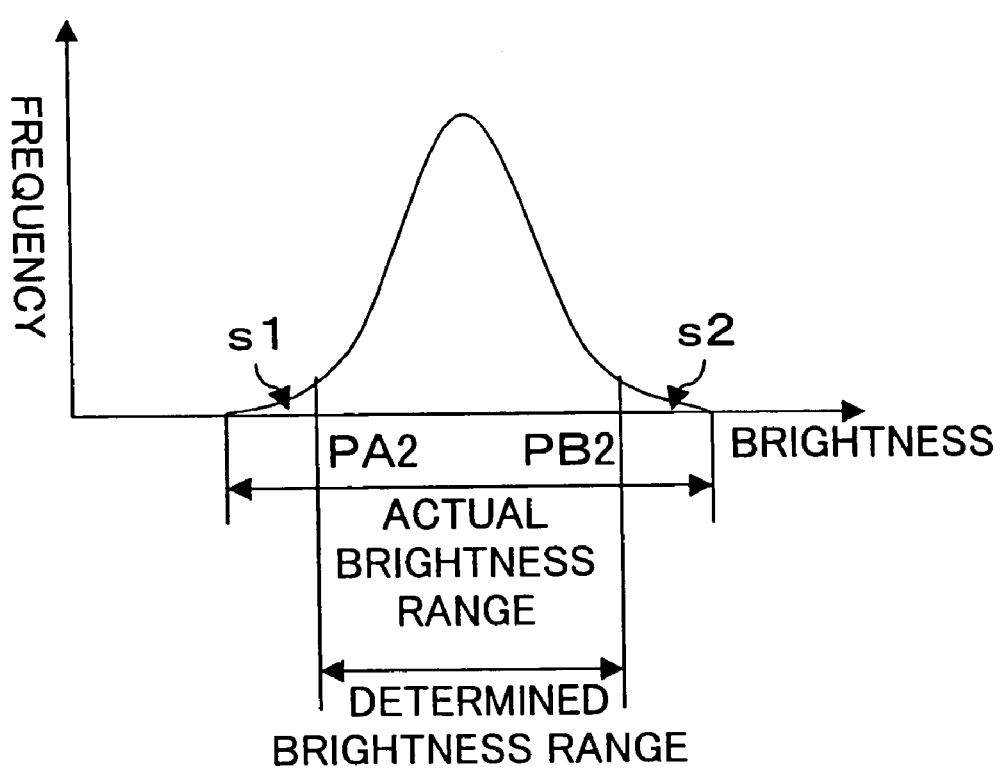
FIG. 13 is a diagram showing an example of brightness distribution.

When the effective area is determined in this way, on the basis of what portion of the brightness distribution forms the effective area, the hem portions are determined. That is, as shown in FIG. 13, the brightness PA2 at which the value obtained by integrating the frequencies of different brightness values with respect to brightness from the lowest brightness upward within the portion of the brightness distribution that forms the effective area becomes equal to α percent of the effective area is calculated, and also the brightness PB2 at which the value obtained by integrating the frequencies of different brightness values with respect to brightness from the highest brightness downward within the portion of the brightness distribution that forms the effective area becomes equal to α percent of the effective area is calculated. Then, the portion s1 corresponding to brightness lower than the brightness PA2 and the portion s2 corresponding to brightness higher than the brightness PB2 are determined as the hem portions.

The hem portions thus determined are removed from the brightness distribution, and the brightness range that remains thereafter in the brightness distribution is determined as the brightness range of the subject (STEP 17). That is, in FIG. 13, the brightness range from the brightness PA2 (corresponding to the black level BL3) to the brightness PB2 (corresponding to the white level WL3) is determined as the brightness range of the subject. In cases where, like the region Sc shown in FIG. 12, the effective region has a shape having hem portions already removed, the brightness at both ends of the effective region may be used as the upper and lower limits of the brightness range of the subject (that is, it is assumed that α=0 percent).

On the basis of the thus determined brightness range, as in the second embodiment, the black level BL3 corresponding to the brightness PA2 and the white level WL3 corresponding to the brightness PB2 are fed to the calculation formula determiner 4 to make it determine a calculation formula to be used to determine a dynamic range. Subsequently, using the calculation formula thus determined, the dynamic range converter 5 performs calculation on the image data output from the area sensor 1.

By determining the brightness range of a subject in accordance with the shape of the brightness distribution in this way, it is possible to determine proper brightness ranges with subjects having different brightness distribution, and thus shoot various subjects properly.

Fifth Embodiment

Figure 14:
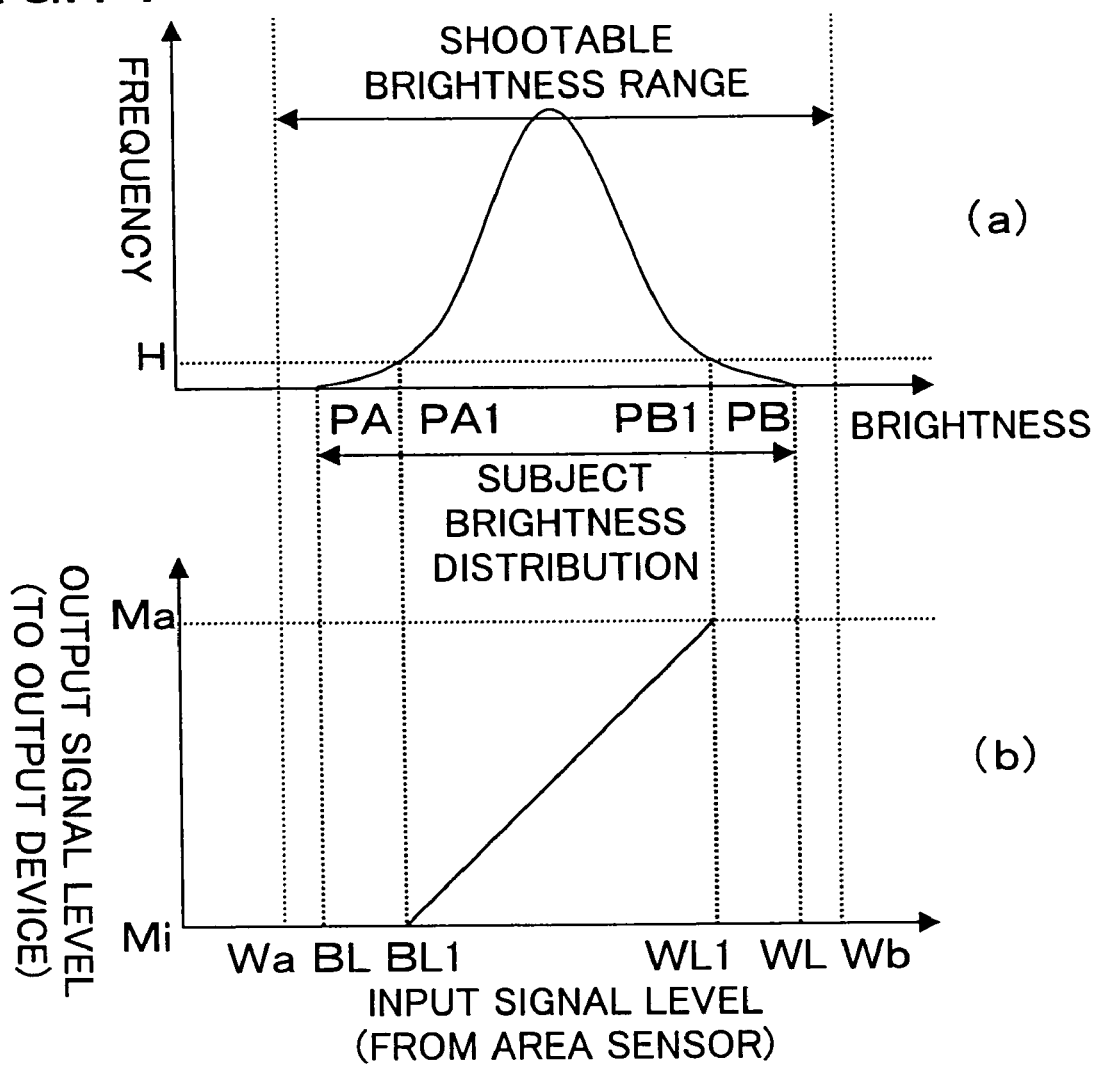
FIG. 14 is a graph showing the relationship between the brightness distribution of a subject and the brightness range obtained by the image-sensing apparatus of a fifth embodiment of the invention.
Figure 15:
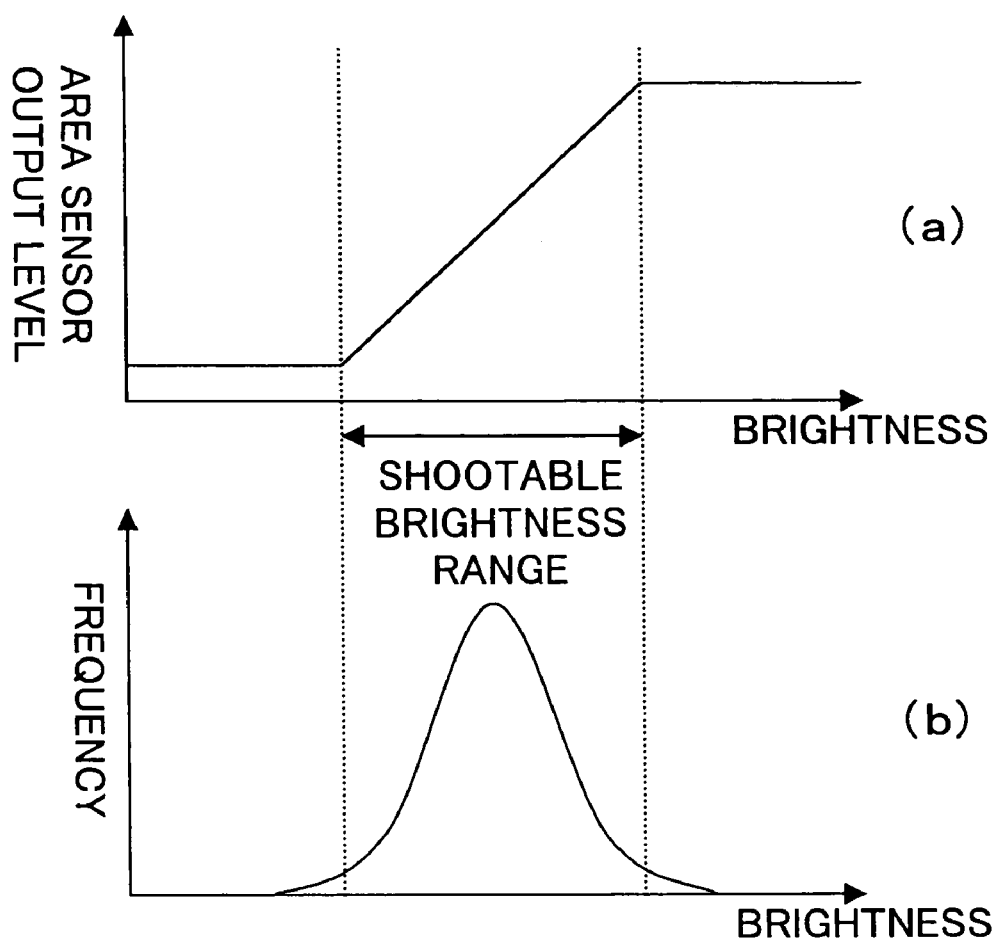
FIG. 15 is a graph showing the relationship among the brightness distribution of a subject, the level of the input signal to an output device, and the level of the output signal from an area sensor.
Figure 16:
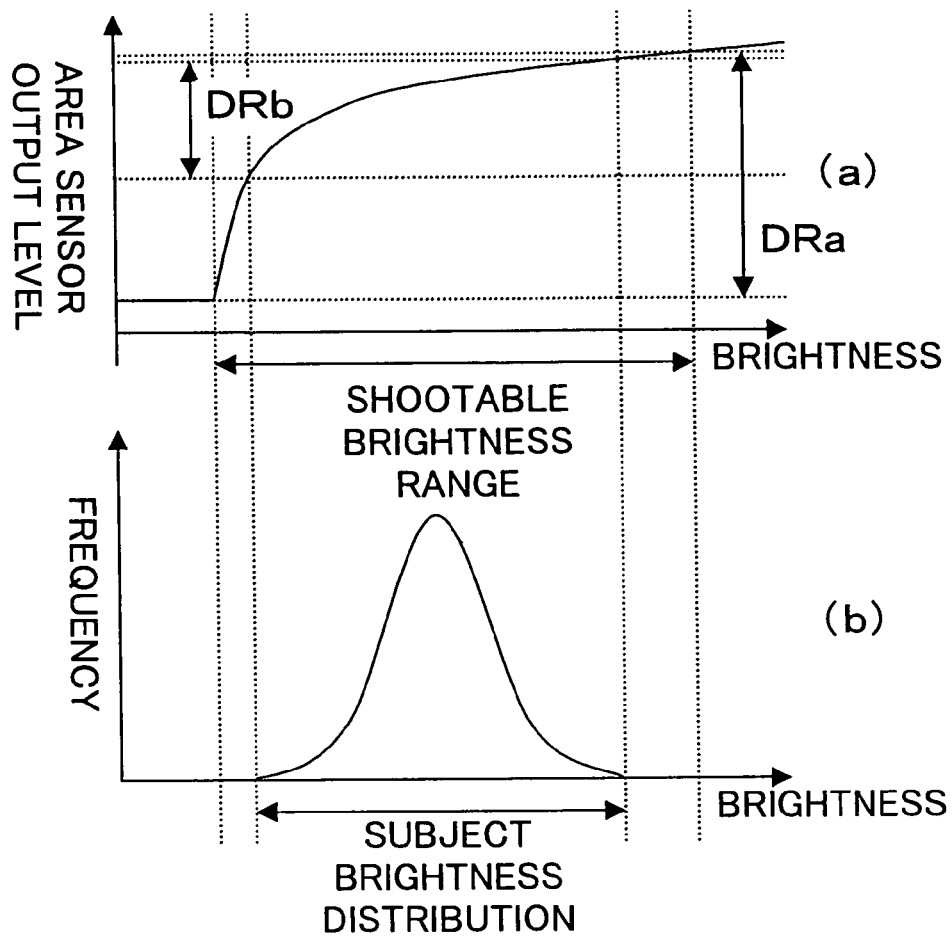
FIG. 16 is a graph showing the relationship among the brightness distribution of a subject, the level of the input signal to an output device, and the level of the output signal from an area sensor.
Figure 17:
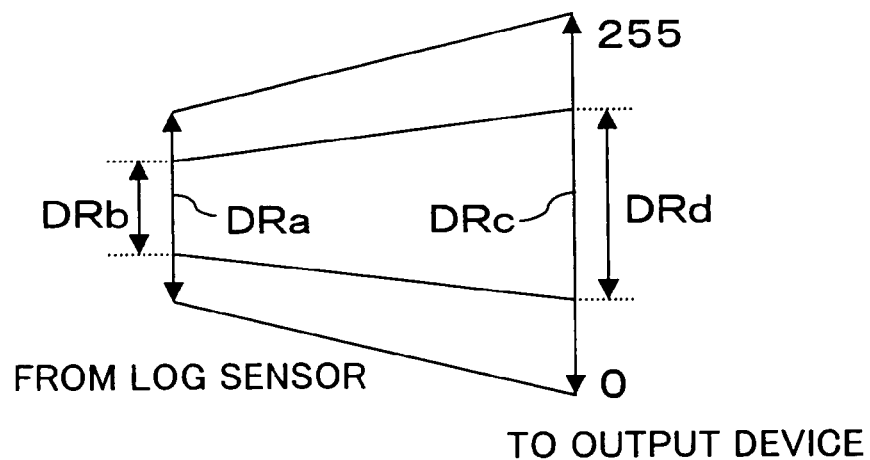
FIG. 17 is a diagram showing the relationship between the dynamic range of a LOG sensor and the level of the signal fed to an output device.

A fifth embodiment of the present invention will be described below with reference to the relevant drawings. FIG. 14 is a graph showing the relationship between the brightness distribution of a subject and the brightness range obtained by the image-sensing apparatus of this embodiment. The image-sensing apparatus of this embodiment has the same internal configuration as that of the second embodiment shown in FIG. 4.

In this embodiment, the area sensor 1, the calculation formula determiner 4, the dynamic range converter 5, the output device 6, and the brightness distribution evaluator 7 operate in the same manner as in the image-sensing apparatus of the second embodiment, and therefore no detailed descriptions will be given below as to their operation. Now, the operation of the black-level and white-level detectors 2 and 3 will be described.

In the image-sensing apparatus of this embodiment, as shown in FIG. 14, on the basis of the brightness distribution evaluated by the brightness distribution evaluator 7, the black-level detector 2 finds the brightness PA1 at which the frequencies of different brightness values first reach a predetermined frequency H when checked from the lowest brightness PA of the brightness distribution upward, and detects the signal level at that brightness PA1 as the black level BL1. Similarly, on the basis of the brightness distribution evaluated by the brightness distribution evaluator 7, the white-level detector 3 finds the brightness PB1 at which the frequencies of different brightness values first reach the predetermined frequency H when checked from the highest brightness PB of the brightness distribution downward, and detects the signal level at that brightness PB1 as the white level WL1.

The black and white levels BL1 and WL1 thus detected by the black-level and white-level detectors 2 and 3, respectively, are then fed to the calculation formula determiner 4 to make the calculation formula determiner 4 determine a calculation formula to be used to determine a dynamic range. Subsequently, using the thus determined calculation formula, the dynamic range converter 5 performs calculation on the image data output from the area sensor 1.

In this embodiment, the same value H is set as the predetermined frequency in both the black-level and white-level detectors 2 and 3; however, it is also possible to set different values of H for the black-level and white-level detectors 2 and 3.

As described above, in this embodiment, the hem portions in which the frequencies of different brightness values do not reach a predetermined value are removed from the brightness distribution evaluated. Thus, even in cases where the brightness distribution evaluated has considerably extended hem portions, it is possible to determine the brightness range of a subject properly. The above-described flow of operations performed in this embodiment may be performed on the effective region determined in the fourth embodiment in order to determine the brightness range of a subject and then find the white and black levels WL3 and BL3.

In any of the first to fifth embodiments, the output device does not necessarily have to be a display as specifically named above as an example, but may be a storage device or the like that permits storage of image data on a magnetic disk. Moreover, although all of those embodiments deal with an image-sensing apparatus for shooting a subject in motion, the present invention is applicable also to an image-sensing apparatus such as a digital camera for shooting a subject at rest.

As described heretofore, when a photoelectric conversion device of a type that converts logarithmically the electric signals produced by photosensitive devices is used, its shootable brightness range is usually wider than the actual brightness range of a subject that is shot. However, according to the present invention, the signal fed from the photoelectric conversion device to an output device is subjected to level conversion in accordance with the brightness range of a subject so that the dynamic range of this signal is adapted to the dynamic range of the output device. By reproducing on the output device the signal that has thus undergone level conversion, it is possible to obtain an image with appropriate contrast.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image-sensing apparatus comprising:
    a photoelectric conversion device, having a plurality of photosensitive devices that produce electric signals in accordance with brightness of light incident thereon, for converting logarithmically the electric signals produced by the individual photosensitive devices;
    a brightness distribution evaluator for evaluating brightness distribution of the subject by determining frequencies of different brightness values sensed by the individual photosensitive devices in accordance with the electric signals output from the photoelectric conversion device,
    a determiner for determining a brightness range of the subject to be targeted by level conversion by detecting hem portion brightness of a subject in accordance with the brightness distribution evaluated by the brightness distribution evaluator, wherein the determiner calculates an effective area of the brightness distribution by determining the number of brightness frequency ridges in the brightness distribution of the subject and, if there is more than one brightness frequency ridge in the brightness distribution, removing each brightness frequency ridge having an integrated area smaller than a predetermined proportion of the integrated area of the largest brightness frequency ridge of the brightness distribution, and wherein the determiner determines the hem portion brightness based on the effective area; and
    a converter for performing level conversion on the electric signals for a single frame output from the photoelectric conversion device and for cutting at least a portion of the hem portion brightness of the electrical signals for the single frame output in such a way that the brightness range of the subject as determined by the determiner is adapted to a dynamic range of an output device used to reproduce an image.

2. An image-sensing apparatus as claimed in claim 1, wherein the determiner determines as the brightness range of the subject a range from lowest brightness to highest brightness represented by the electric signals output from the photoelectric conversion device.

3. An image-sensing apparatus as claimed in claim 1, further comprising:
    wherein the determiner evaluates two adjacent brightness frequency ridges by determining if the brightness frequency trough between the two adjacent brightness frequency ridges is higher than a predetermined threshold and evaluates the two adjacent brightness frequency ridges as one brightness frequency ridge if the brightness frequency trough is higher than the predetermined threshold.

4. An image-sensing apparatus as claimed in claim 1, wherein the determiner determines as the hem portion brightness of the subject a range from a first brightness to a second brightness, the first brightness being a brightness at which a value obtained by integrating the effective area with respect to brightness from maximum brightness downward becomes greater than a first predetermined proportion of a value obtained by integrating the entire effective area with respect to brightness, the second brightness being a brightness at which a value obtained by integrating the effective area with respect to brightness from minimum brightness upward becomes greater than a second predetermined proportion of the value obtained by integrating the entire effective area with respect to brightness.

5. An image-sensing apparatus as claimed in claim 1, wherein the determiner determines the brightness range of the subject in accordance with a shape of the effective area.

6. An image-sensing apparatus as claimed in claim 1, wherein the determiner determines as the hem portion brightness of the subject a range from a brightness at which the frequencies of different brightness values first reach a first predetermined frequency when checked from maximum brightness downward in the effective area to brightness at which the frequencies of different brightness values first reach a second predetermined frequency when checked from minimum brightness upward in the effective area.

7. An image-sensing apparatus as claimed in claim 1, wherein the determiner determines as the brightness range of the subject a range between values entered from outside as minimum and maximum brightness of the brightness range of the subject.

8. An image-sensing apparatus as claimed in claim 1, wherein the converter performs calculation necessary to achieve the level conversion of the electric signals output from the photoelectric conversion device by using minimum and maximum brightness of the brightness range of the subject as determined by the determiner.

9. An image-sensing apparatus as claimed in claim 8, wherein the conversion is achieved by converting signal levels x of the individual electric signals output from the photoelectric conversion device into signal levels y using the following formula:

$$y = \frac{Ma - Mi}{WL - BL}(x - BL)$$

where x represents signal levels of the individual electric signals output from the photoelectric conversion device, y represents signal levels output from the converter, Ma represents a maximum level that the output device can handle, Mi represents a minimum level that the output device can handle, BL represents the lowest brightness of the brightness range of the subject as determined by the determiner, and WL represents the highest brightness of the brightness range of the subject as determined by the determiner.

10. An image-sensing apparatus comprising:
a photoelectric conversion device, having a plurality of photosensitive devices that produce electric signals in accordance with brightness of light incident thereon, for converting logarithmically the electric signals produced by the individual photosensitive devices;
a brightness distribution evaluator for evaluating of the subject by determining frequencies of different brightness values sensed by the individual photosensitive devices in accordance with the electric signals output from the photoelectric conversion device.
a determiner for determining a brightness range to be targeted by level conversion by detecting a hem portion brightness of a subject in a frame of electric signals output from the photoelectric conversion device, wherein the determiner calculates an effective area of the brightness distribution by determining the number of brightness frequency ridges in the brightness distribution of the subject and, if there is more than one brightness frequency ridge in the brightness distribution, removing each brightness frequency ridge having an integrated area smaller than a predetermined proportion of the integrated area of the largest brightness frequency ridge of the brightness distribution, and wherein the determiner determines the hem portion brightness based on the effective area; and a converter for performing level conversion on the frame of electric signals output from the photoelectric conversion device and for cutting at least a portion of the hem portion brightness of the electrical signals for the single frame output in such a way that the brightness range of the subject as determined by the determiner is adapted to a dynamic range of an output device used to reproduce an image.

11. An image-sensing apparatus as claimed in claim 10, wherein the determiner determines as the brightness range of the subject a range from lowest brightness to highest brightness represented by the electric signals output from the photoelectric conversion device.

12. An image-sensing apparatus as claimed in claim 10, further comprising:
wherein the determiner evaluates two adjacent brightness frequency ridges by determining if the brightness frequency trough between the two adjacent brightness frequency ridges is higher than a predetermined threshold and evaluates the two adjacent brightness frequency ridges as one brightness frequency ridge if the brightness frequency trough is higher than the predetermined threshold.

13. An image-sensing apparatus as claimed in claim 12 wherein the determiner determines as the hem portion brightness of the subject a range from a brightness at which the frequencies of different brightness values first reach a first predetermined frequency when checked from maximum brightness downward in the effective area to brightness at which the frequencies of different brightness values first reach a second predetermined frequency when checked from minimum brightness upward in the effective area.

14. An image-sensing apparatus as claimed in claim 10, wherein the determiner determines as the hem portion brightness of the subject a range from a first brightness to a second brightness, the first brightness being a brightness at which a value obtained by integrating the effective area with respect to brightness from maximum brightness downward becomes greater than a first predetermined proportion of a value obtained by integrating the entire effective area with respect to brightness, the second brightness being a brightness at which a value obtained by integrating the effective area with respect to brightness from minimum brightness upward becomes greater than a second predetermined proportion of the value obtained by integrating the entire effective area with respect to brightness.

15. An image-sensing apparatus as claimed in claim 10, wherein the determiner determines the brightness range of the subject in accordance with a shape of the effective area.

16. An image-sensing apparatus as claimed in claim 10, wherein the determiner determines as the brightness range of the subject a range between values entered from outside as minimum and maximum brightness of the brightness range of the subject.

17. An image-sensing apparatus as claimed in claim 10, wherein the converter performs calculation necessary to achieve the level conversion of the electric signals output from the photoelectric conversion device by using minimum and maximum brightness of the brightness range of the subject as determined by the determiner.

18. An image-sensing apparatus as claimed in claim 17, wherein the conversion is achieved by converting signal levels x of the individual electric signals output from the photoelectric conversion device into signal levels y using the following formula:

$$y = \frac{Ma - Mi}{WL - BL}(x - BL)$$

where x represents signal levels of the individual electric signals output from the photoelectric conversion device, y represents signal levels output from the converter, Ma represents a maximum level that the output device can handle, Mi represents a minimum level that the output device can handle, BL represents the lowest brightness of the brightness range of the subject as determined by the determiner, and WL represents the highest brightness of the brightness range of the subject as determined by the determiner.

19. An image-sensing apparatus comprising:
a photoelectric conversion device, having a plurality of photosensitive devices that produce electric signals in accordance with brightness of light incident thereon, the photoelectric conversion device having the capability of converting the electric signals produced by the individual photosensitive devices according to a conversion function;
a brightness distribution evaluator for evaluating brightness distribution of the subject by determining frequencies of different brightness values sensed by the individual photosensitive devices in accordance with the electric signals output from the photoelectric conversion device.
a determiner for determining a brightness range to be targeted by Level conversion by detecting a hem portion brightness of a subject, wherein the determiner calculates an effective area of the brightness distribution by determining the number of brightness frequency ridges in the brightness distribution of the subject and, if there is more than one brightness frequency ridge in the brightness distribution, removing each brightness frequency ridge having an integrated area smaller than a predetermined proportion of the integrated area of the largest brightness frequency ridge of the brightness distribution, and wherein the determiner determines the hem portion brightness based on the effective area; and
a converter for performing level conversion on the electric signals for a single frame output from the photoelectric conversion device and for cutting at least a portion of the hem portion brightness of the electrical signals for the single frame output in such a way that the brightness range of the subject as determined by the determiner is adapted to a dynamic range of an output device used to reproduce an image.

20. An image-sensing apparatus as claimed in claim 19, wherein the determiner determines as the brightness range of the subject a range from lowest brightness to highest brightness represented by the electric signals output from the photoelectric conversion device.

21. An image-sensing apparatus as claimed in claim 19, further comprising:
wherein the determiner evaluates two adjacent brightness frequency ridges by determining if the brightness frequency trough between the two adjacent brightness frequency ridges is higher than a predetermined threshold and evaluates the two adjacent brightness frequency ridges as one brightness frequency ridge if the brightness frequency trough is higher than the predetermined threshold.

22. An image-sensing apparatus as claimed in claim 19, wherein the determiner determines as the hem portion brightness of the subject a range from a first brightness to a second brightness, the first brightness being a brightness at which a value obtained by integrating the effective area with respect to brightness from maximum brightness downward becomes greater than a first predetermined proportion of a value obtained by integrating the entire effective area with respect to brightness, the second brightness being a brightness at which a value obtained by integrating the effective area with respect to brightness from minimum brightness upward becomes greater than a second predetermined proportion of the value obtained by integrating the entire effective area with respect to brightness.

23. An image-sensing apparatus as claimed in claim 19, wherein the determiner determines the brightness range of the subject in accordance with a shape of the effective area.

24. An image-sensing apparatus as claimed in claim 19, wherein the determiner determines as the hem portion brightness of the subject a range from a brightness at which the frequencies of different brightness values first reach a first predetermined frequency when checked from maximum brightness downward in the effective area to brightness at which the frequencies of different brightness values first reach a second predetermined frequency when checked from minimum brightness upward in the effective area.

25. An image-sensing apparatus as claimed in claim 19, wherein the determiner determines as the brightness range of the subject a range between values entered from outside as minimum and maximum brightness of the brightness range of the subject.

26. An image-sensing apparatus as claimed in claim 19, wherein the converter performs calculation necessary to achieve the level conversion of the electric signals output from the photoelectric conversion device by using minimum and maximum brightness of the brightness range of the subject as determined by the determiner.

27. An image-sensing apparatus as claimed in claim 26, wherein the conversion is achieved by converting signal levels x of the individual electric signals output from the photoelectric conversion device into signal levels y using the following formula:

$$y = \frac{Ma - Mi}{WL - BL}(x - BL)$$

where x represents signal levels of the individual electric signals output from the photoelectric conversion device, y represents signal levels output from the converter, Ma represents a maximum level that the output device can handle, Mi represents a minimum level that the output device can handle, BL represents the lowest brightness of the brightness range of the subject as determined by the determiner, and WL represents the highest brightness of the brightness range of the subject as determined by the determiner.

* * * * *

UNITED STATES PATENT AND TRADEMARK OFFICE
CERTIFICATE OF CORRECTION

| | |
|---|---|
| PATENT NO. | : 7,230,644 B2 |
| APPLICATION NO. | : 11/028975 |
| DATED | : June 12, 2007 |
| INVENTOR(S) | : Satoshi Nakamura and So Yano |

It is certified that error appears in the above-identified patent and that said Letters Patent is hereby corrected as shown below:

<u>Column 13</u>:
Line 61, delete "evaluating of the" and insert -- evaluating brightness distribution of the --.

Signed and Sealed this

Fourteenth Day of August, 2007

JON W. DUDAS
*Director of the United States Patent and Trademark Office*